Nov. 22, 1966   F. A. KLING ETAL   3,286,701
EXHAUST PORT COOLING STRUCTURE FOR ROTARY ENGINES
Filed Nov. 18, 1964   4 Sheets-Sheet 1

Nov. 22, 1966   F. A. KLING ETAL   3,286,701
EXHAUST PORT COOLING STRUCTURE FOR ROTARY ENGINES
Filed Nov. 18, 1964   4 Sheets-Sheet 2

INVENTORS
FREDERICK A. KLING
ROLAND L. BOWLBY
BY
ATTORNEY

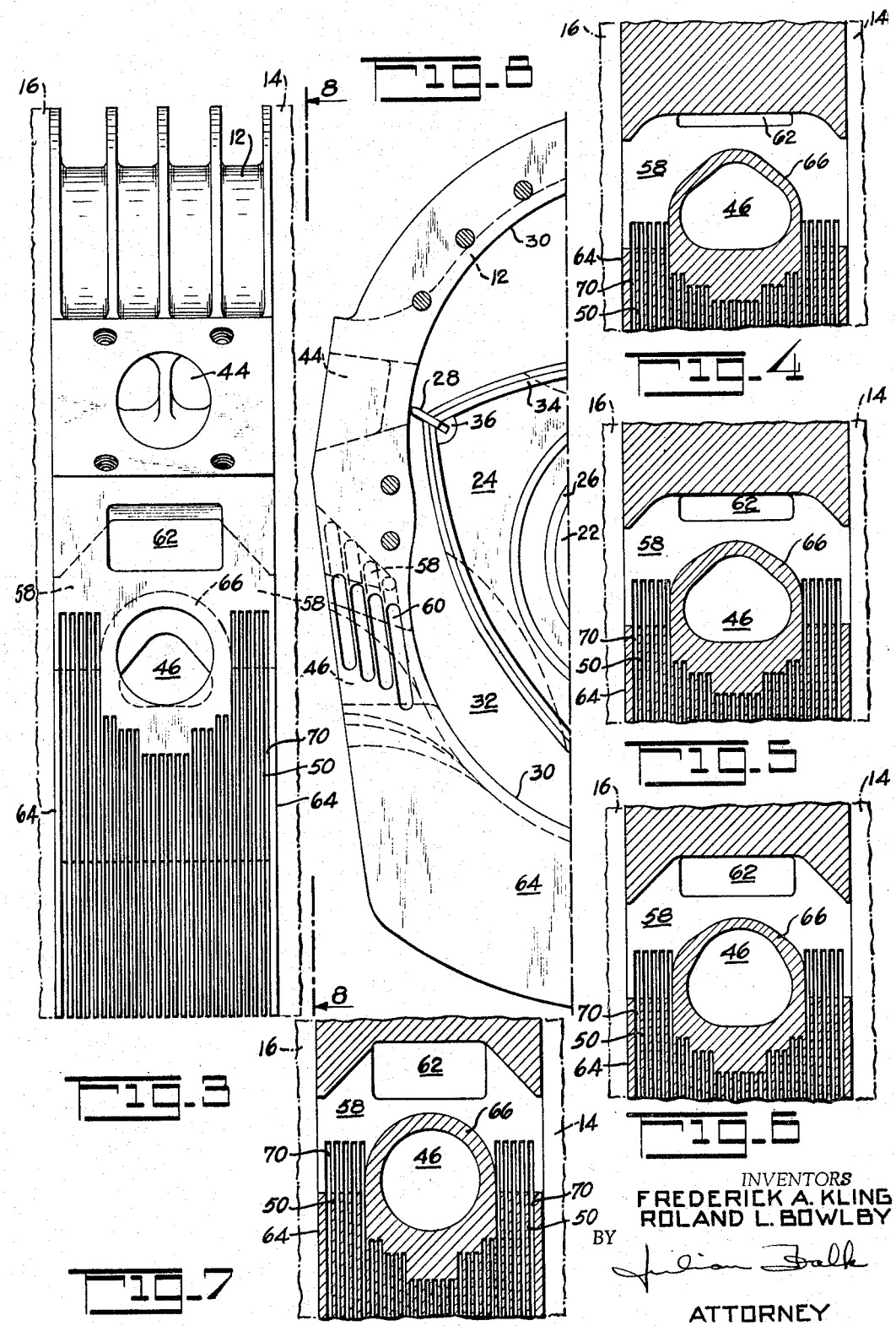

Nov. 22, 1966  F. A. KLING ETAL  3,286,701
EXHAUST PORT COOLING STRUCTURE FOR ROTARY ENGINES
Filed Nov. 18, 1964  4 Sheets-Sheet 4

INVENTORS
FREDERICK A. KLING
ROLAND L. BOWLBY
BY
ATTORNEY

United States Patent Office 3,286,701
Patented Nov. 22, 1966

3,286,701
EXHAUST PORT COOLING STRUCTURE
FOR ROTARY ENGINES
Frederick A. Kling, North Haledon, and Roland L. Bowlby, Wyckoff, N.J., assignors to Curtiss-Wright Corporation, a corporation of Delaware
Filed Nov. 18, 1964, Ser. No. 412,020
7 Claims. (Cl. 123—8)

This invention relates to rotary engines and is particularly directed to an improvement in exhaust port cooling structures for rotary combustion engines of the type disclosed in copending application, Serial No. 225,316, filed September 21, 1962, by Charles Jones and entitled "Air Cooling System for Rotary Combustion Engine" and an application entitled "Improvements in Air Cooled Rotary Combustion Engine" by Max Bentele et al.

The cooling of the exhaust port in rotary engines of the type to which the present invention is directed is an especially difficult problem since this region is heated not only from the exhaust gases which pass through the exhaust port but also from the high heat input to the rotor housing surface. In order to provide cooling for this difficult to cool region it is desirable to provide a sufficient number of cooling passages as close to the exhaust port walls and the rotor housing inner surface as possible within the structural limitations of the rotor housing. It is also desirable to cool this region with a minimum amount of cooling air since the supply of cooling air is directly coupled to the cooling blower horsepower drain on the engine which obviously must be kept to a minimum. The present invention provides for a novel exhaust port cooling structure which effectively cools the exhaust port area with a minimum amount of cooling air and also provides greater structural strength of the rotor housing in this area. The structure of the invention permits a substantially thin wall construction without reducing overall structural strength of the exhaust port area which thinner wall construction also provides for improved heat transfer characteristics.

The invention is generally carried out by providing a plurality of air cooling passages within the rotor housing wall which passages are spaced along and substantially surround a major portion of the exhaust port area. The cooling passages have openings at their upstream ends for receiving air from the main supply stream of cooling air to the rotor housing cooling passages or from the cooling passages through the end and intermediate housings. In one embodiment of the invention the passages are further provided with a common opening at their downstream end for discharging the cooling air from the exhaust port area cooling passages. As will be apparent from the following detailed description, the cooling passage structure is such that cooling air is carried in close proximity to the exhaust port walls for quickly transferring heat therefrom and that through the novel structure of the invention excess air or air from a separate source other than the cooling air from the main cooling system is not required for adequately cooling the exhaust port area.

Accordingly, it is one object of the invention to provide a novel and improved cooling structure for the exhaust port region of a rotary engine.

It is another object of the invention to provide a novel and improved air cooling structure for the exhaust port region of a rotary combustion engine which requires a minimum amount of cooling air for cooling said region.

It is a further object of the invention to provide a novel and improved cooling structure for the exhaust port region of a rotary combustion engine which permits a relatively thin wall construction in said region for improving the heat transfer characteristics of said region.

Other objects and advantages of the invention will become apparent upon reading the following detailed description in which:

FIG. 3 is a plan view of the rotor housing itself taken in the direction of line 3—3 of FIG. 2;

FIGS. 4–7 are sectional views taken along lines 4—4, 5—5, 6—6 and 7—7 of FIG. 2;

FIG. 8 is a partial side view of the rotor housing of the invention taken in the direction of 8—8 of FIG. 3;

Figure 1:
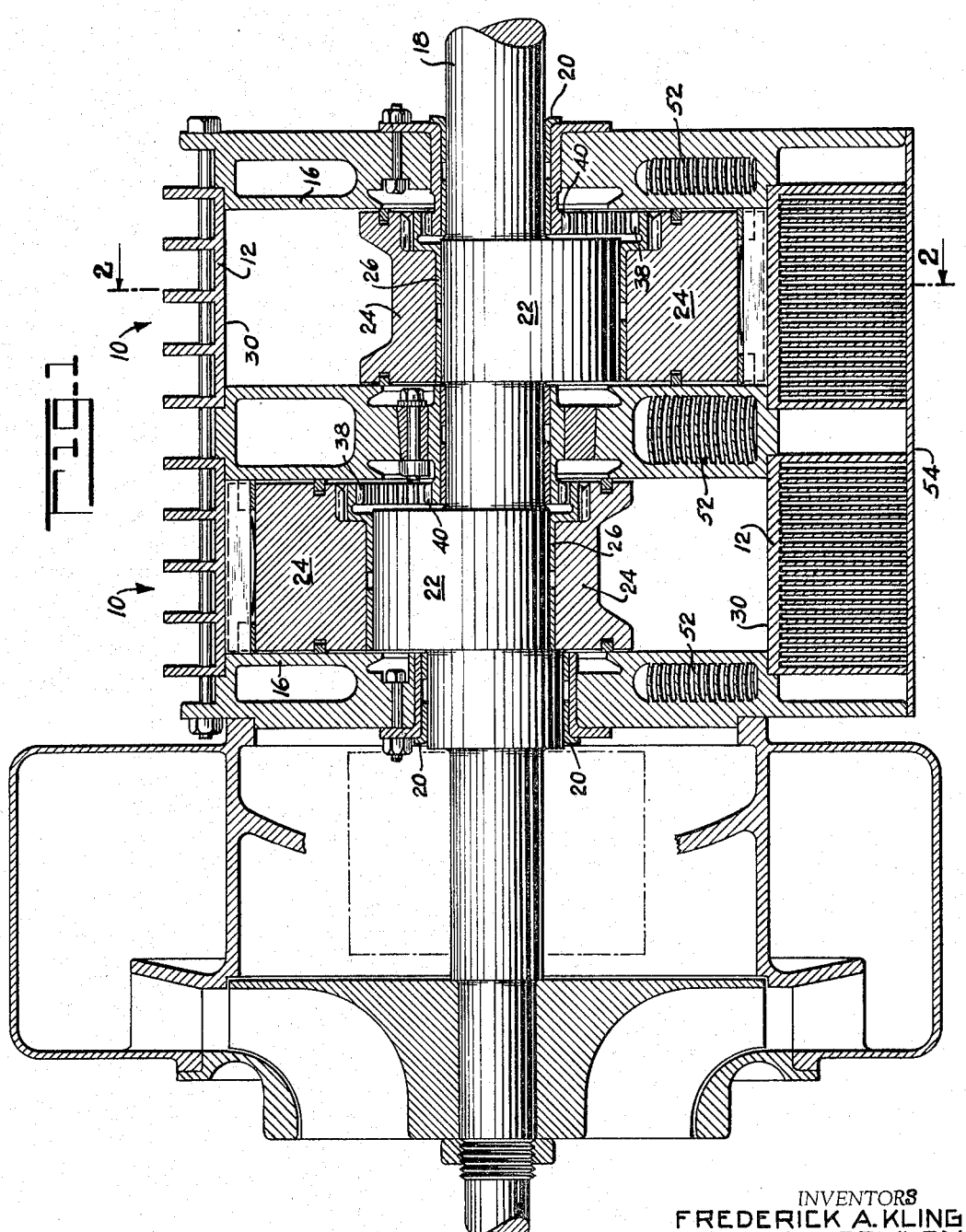
FIG. 1 is an axial sectional view of a rotary combustion engine of the type embodying the invention.
Figure 2:
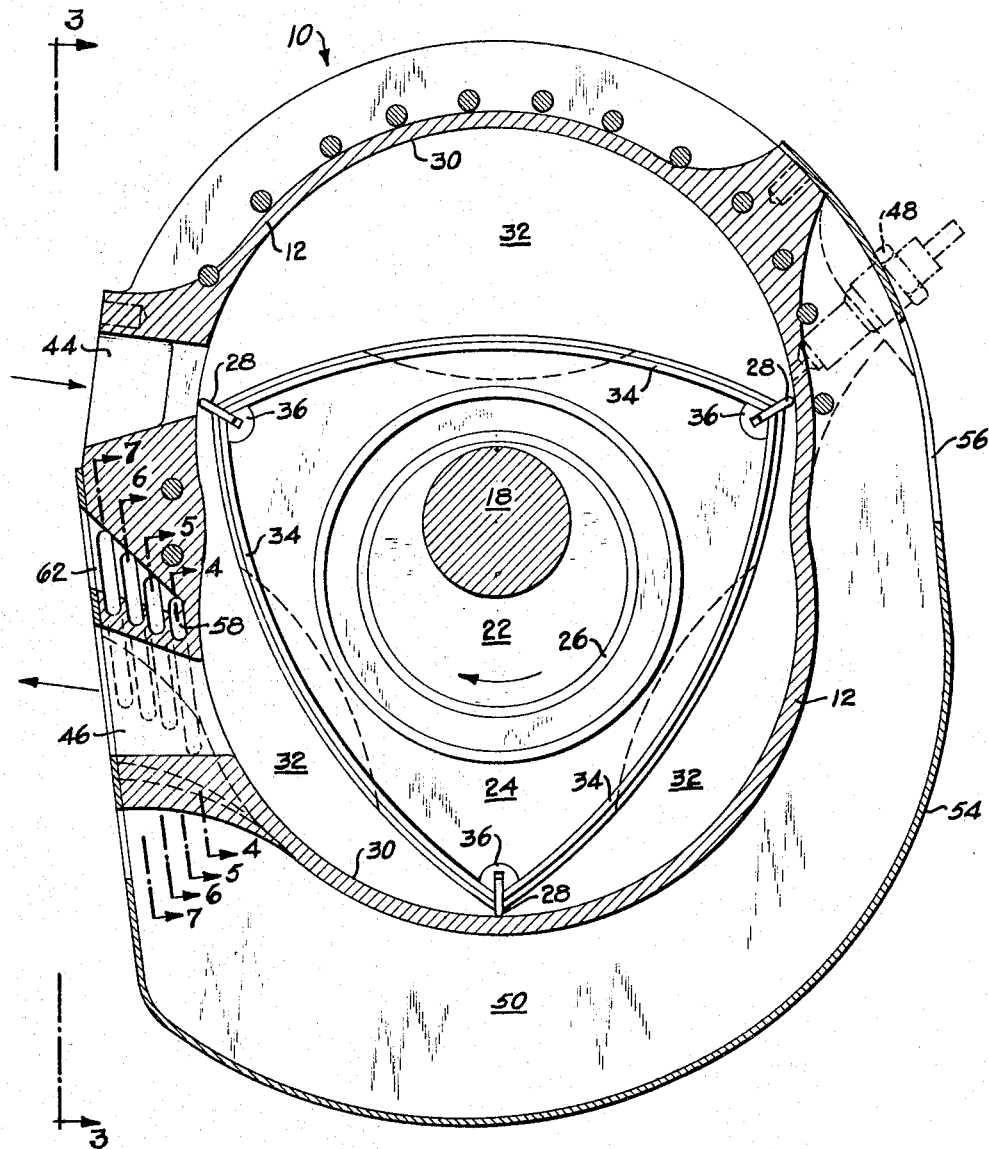
FIG. 2 is a sectional view taken along line 2—2 of FIG. 1.

Referring to FIGS. 1 and 2 of the drawings, a rotary combustion engine is illustrated therein which is composed of two rotary combustion units 10. The rotary combustion units 10 each include an outer body formed by a main rotor housing or peripheral wall 12 with each said peripheral wall 12 being inter-connected at one end by a common end or intermediate housing 14 and an end housing 16 connected to each of the axially outer ends of each of said peripheral walls 12 to enclose the housing of each rotary mechanism and thereby form cavities therein. As illustrated in FIG. 2, the profile of the inner surface of the peripheral wall 12 has a shape which may be defined as basically a two-lobed epitrochoid.

A shaft 18 is rotatably supported in the engine by suitable bearings 20 which shaft has a pair of eccentric portions 22 formed thereon which are preferably oppositely directed, as illustrated, and upon each of which there is rotatably supported a rotor 24 by a suitable bearing 26. Referring to FIG. 2, it will be seen that the rotors 24 each have three circumferentially-spaced apex portions each of which carries a seal strip 28 for sealing engagement with the inner surface 30 of the peripheral walls 12 to thereby form working chambers 32 between the rotor apex portions which working chambers, upon relative rotation of the rotor 24 in the outer body, vary in volume. Seals 34, mounted in the side faces of each rotor 22, engage the side faces of the end housings in sealing engagement and cooperate with seals 36 to provide a continuous seal between the respective chambers 32 to prevent any leakage between the working chambers. Each rotor 24 further carries an internally-toothed gear 38 (FIG. 1) which gear 38 meshes with an externally-toothed gear 40 supported by the end wall 16 or intermediate housing 14 which gears 38 and 40 serve to guide the rotor in tracing its epitrochoidal path.

Each of the rotary units 10 is further provided with an intake port 44 for admitting air or a fuel-air mixture, an exhaust port 46 for expelling any burnt gases from the engine and an ignition means 48 is also provided so that during engine operation the stages of intake, compression, expansion and exhaust may be carried out. It will be apparent however that the invention as will be described herein is not limited to a multi-unit rotary combustion engine as illustrated but may also be embodied in a single unit engine or engines having more than two units. Further, the engine is also not limited to spark ignition means as illustrated although such ignition means is preferably used.

As explained in the above-mentioned copending applications, combustion in engines of this type always takes place adjacent the same region of the periphery of the outer body so that the heat input is not uniform. Referring to FIG. 2 it will be seen that combustion takes place adjacent the region including the spark plug 48 where in a working chamber 32 the combustible mixture will be ignited and transferred in the direction of rotation to the exhaust port 46 for discharge therefrom. It will be apparent therefore that the region from the spark plug 48 to the exhaust port 46 in the direction of rotor rotation will be substantially heated up during engine operation while in the region from the intake port 44 to the spark plug 48 the engine outer body will be relatively cool. As further explained in said copending applications, in order to cool this relatively hot region of the outer body a plurality of fins 50 are provided on the outer periphery of the peripheral wall 12 which fins 50 are spaced along an axis parallel to the axis of the outer body. Fins 52 are also provided within a portion of the end walls 16 and the peripheral wall 14 in the region of relatively high input. Reference may be made to said copending application Serial No. 225,316 for a more detailed description of the fin structure of the end and intermediate housings. A baffle plate 54 is disposed over the relatively hot portion of the outer body (FIG. 2) and covers the peripheral wall cooling fins 50 to provide the plurality of closed individual cooling passages therebetween which baffle plate 54 is also disposed over the end and intermediate housings. An opening 56 is provided in the baffle plate in the region of the spark plug 48 so that air may be supplied to the cooling passages in the peripheral wall for circulation around the relatively hot portion thereof and openings (not shown) are also provided so that air may be supplied to the cooling passages in the end or intermediate housings for circulation therethrough. The cooling air may be supplied by a suitable blower and duct means as clearly shown in said above-mentioned copending applications.

It will be apparent that, as the gases are transferred in a working chamber 32 from the combustion zone to the exhaust port 46 for discharge, the peripheral wall 12 will become substantially heated up. As the exhaust gases are discharged through the exhaust port 46, the high heat from said gases will be effective to heat up the walls of the exhaust port and in combination with the high heat input to the peripheral wall 12 in this region the exhaust port area will have a substantially high heat input. In order to provide effective heat transfer in the exhaust port region it is desirable to provide as thin a wall as structurally feasible without reducing the overall structural strength of the housing. Referring to FIGS. 2–8, it will be seen that a plurality of passages 58 are provided through the peripheral wall which passages 58 substantially surround a major portion of the upstream region of the exhaust port 46. Inlet areas are preferably provided for passing cooling air to said passages 58 in both the peripheral surface of the peripheral wall 12 and in the side faces of the peripheral wall 12 and include inlet openings 60 in the side faces and inlet openings communicating with the passages formed between the cooling fins 50 at the circumferential end of said passages disposed adjacent the axial ends of said peripheral wall 12, as illustrated in FIGS. 3–7. The passages 58 are spaced in a radial direction and communicate with a cooling air discharge port 62 downstream from the exhaust port 46. Thus each of the exhaust port cooling passages terminates in a common cooling air discharge port 62. It will be seen, for example from FIG. 8, that a plurality of ribs 64 are formed between the cooling passages 58 so that even though the wall 66 surrounding the exhaust port is made relatively thin, the ribs 64 will provide structural strength in this region and the overall structural strength of the housing will not be reduced at this point. The cooling air may be supplied through the peripheral wall intake means designated at 70 to each of the exhaust port cooling passages 58 which cooling air flows from the passages formed by the cooling fins 50 and is contained within said passages for supply to the exhaust port cooling passages by means of the baffle plate 54. Cooling air may also be supplied to the exhaust port cooling passages 58 through the inlet means 60 in the side faces of the peripheral wall which air may be supplied from the exhaust air from the end and intermediate housings which housings have a substantially less radial diameter than the peripheral wall, as clearly shown in FIG. 1. This air will also be contained for supply to the passages 60 by the baffle plate 54. Thus it will be seen that cooling air may be supplied in close proximity to the thin wall 66 of the exhaust port for cooling this region which air will then be discharged through the discharge cooling port 62 in substantially the same direction as the exhaust port gases will be cooled by the discharged cooling air from the discharge port 62.

Figure 9:
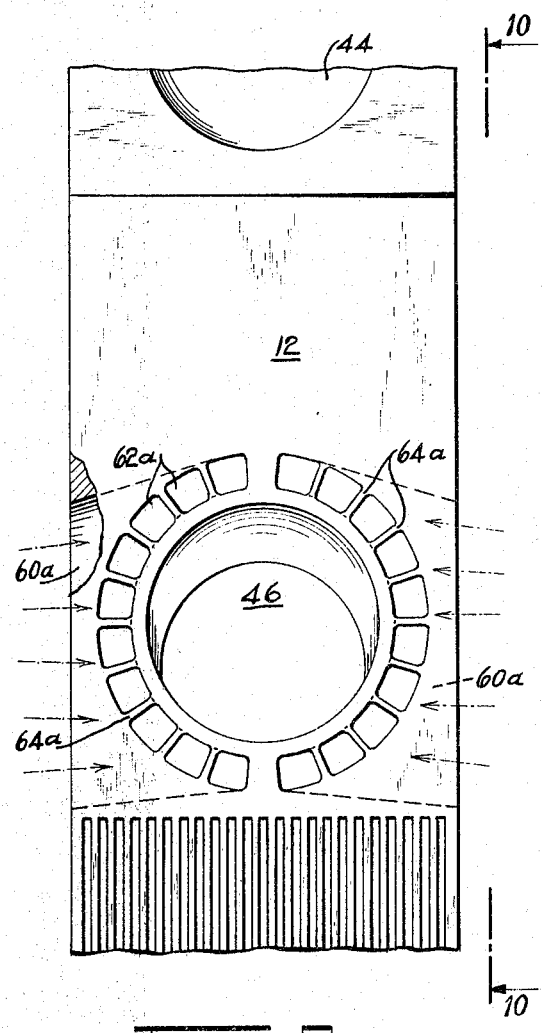
FIG. 9 is a view of a portion of the rotor housing showing another embodiment of the invention.
Figure 10:
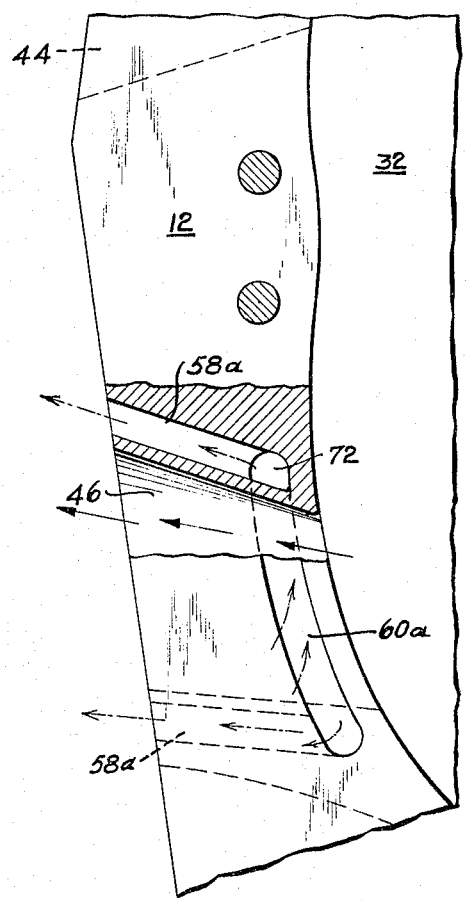
FIG. 10 is a side view of a portion of the rotor housing taken in the direction of line 10—10 of FIG. 9 with a part thereof cut away for purposes of illustration.

Referring to FIGS. 9 and 10 there is illustrated another embodiment of the invention. In FIG. 9 it will be seen that a plurality of exhaust port cooling air passages 58a are provided with said passages being circumferentially-spaced around said exhaust port 46 relative to the exhaust port axis and extending in a direction substantially parallel to said exhaust port axis. A cooling air supply passage 60a is provided in each side of the peripheral wall 12 between the inner and outer surfaces thereof with supply passages 60a each have an opening in its associated peripheral wall side face. The supply passages 60a extend from each said peripheral wall side face in a direction substantially perpendicular to the cooling passages 58a with each said supply passage 60a communicating with an opening 72 at the base or upstream end of a group of cooling passages 58a. Each cooling passage 58a also has a discharge opening 62a at its downstream end for discharging the cooling air in the same direction as the exhaust gases leaving the exhaust port 46. As viewed in FIGS. 9 and 10, it will be seen that one supply passage 60a communicates with half of the cooling passages 58a disposed around one half of the exhaust port 46 while the other supply passage 60a communicates with the other half of the cooling passages 58a. Supporting ribs 64a are provided between adjacent cooling passages 58a which ribs provide structural support to the relatively thin wall structure of the exhaust port 46.

In the embodiment shown in FIGS. 9 and 10, cooling air is supplied to the supply passages 60a by utilizing the discharge air from the end and intermediate housings, as explained in the aforementioned copending applications. The cooling air supplied to a respective supply passage 60a will flow into the openings 72 of its associated cooling passages 58a where said cooling air will then flow through said cooling passages 58a and out through discharge openings 62a for cooling the walls of said exhaust port 46 and the exhaust gases discharged therefrom. It will be seen therefore that the operation of this embodiment is substantially the same as the embodiment previously described.

It will be seen from the above description that an effective means is provided for cooling the highly heated exhaust port region of the engine which means permits the use of a relatively thin exhaust port wall structure while maintaining the structural strength of the peripheral wall. It will also be apparent that effective cooling may be carried out by utilizing the discharged air from the air cooling structure of the peripheral wall and end and intermediate housings and that a separate source of cooling air need not be provided.

While the invention has been set forth in detail in its preferred embodiment in the above description, it should be understood that the invention is not to be limited to these specific details set forth therein and various changes and modifications may be made by those skilled in the art without departing from the spirit and scope of the invention as defined in the following claims.

We claim:

1. An outer body structure for a rotary combustion engine having a plurality of working chambers which carry a working fluid around the outer body axis for combustion in one region of said outer body and for discharge of the combustion gases in a second region of said outer body; said outer body structure including a peripheral wall having an exhaust port formed therein in said second region of said outer body, air cooling means for the walls of said exhaust port including a plurality of enclosed passages provided in said peripheral wall with said passages being spaced along the exhaust port axis and disposed between the inner and outer periphery of said peripheral wall, said passages being in close proximity to the walls of said exhaust port so that said passages surround a substantial portion of the outer wall of said exhaust port and said passages having supply openings at their upstream ends on opposite sides of said exhaust port for supplying cooling air to said passages and having a single common discharge opening circumferentially disposed downstream from said supply opening for discharging cooling air from said passages whereby cooling air will be circulated around the walls of said exhaust port for removing a substantial amount of heat from said second region of said outer body.

2. An outer body structure for a rotary combustion engine as recited in claim 1 wherein said enclosed passages are spaced in a radial direction relative to the outer body axis and having a plurality of ribs formed therebetween with said ribs being disposed so that said ribs provide structural support for said second region of said outer body.

3. An outer body structure for a rotary combustion engine as recited in claim 1 wherein said peripheral wall includes a plurality of spaced cooling fins surrounding a substantial portion of said first and second regions of said outer body, said spaced fins forming a plurality of cooling air passages spaced axially across said peripheral wall and extending in a circumferential direction around said portion of said outer body and said supply openings comprising cooling air inlet openings in the peripheral surface of said peripheral wall with said inlet openings including the discharge ends of at least some of said cooling air passages disposed adjacent the axial ends of said peripheral wall.

4. An outer body structure for a rotary combustion engine as recited in claim 1 wherein said supply openings comprise inlet openings in each side face of said peripheral wall.

5. An outer body structure for a rotary combustion engine as recited in claim 1 wherein said single common discharge opening is disposed in the outer peripheral surface of said peripheral wall and downstream of said exhaust port with said discharge opening being oriented relative to said exhaust port so that the cooling air from said enclosed passages will be discharged in the same direction as the exhaust gases from said exhaust port whereby the hot exhaust gases will be cooled by the discharged cooling air from said discharge opening.

6. An outer body structure for a rotary combustion engine having a plurality of working chambers which carry a working fluid around the outer body axis for combustion in one region of said outer body and for discharge of the combustion gases in a second region of said outer body; said outer body structure including a peripheral wall having an exhaust port formed therein in said second region of said outer body with said exhaust port having a relatively thin wall structure, air cooling means for the walls of said exhaust port including a plurality of enclosed cooling air passages surrounding a substantial portion of said exhaust port and in relatively close proximity to the walls of said exhaust port, cooling air supply openings provided in each side face of said peripheral wall with said supply openings being disposed for supplying cooling air to said enclosed cooling air passages, each said cooling air passage communicating with a discharge opening disposed for discharging the cooling air from said cooling air passages in a direction substantially parallel to the exhaust port axis so that the cooling air flows through said cooling air passages for cooling the relatively thin wall of said exhaust port and for cooling the exhaust gases discharged from said exhaust port, and supporting ribs for the relatively thin wall structure of said exhaust port disposed between said cooling air passages and connected with said relatively thin wall structure of said exhaust port so that said supporting ribs provide structural support for said relatively thin wall structure of said exhaust port.

7. An outer body structure for a rotary combustion engine as recited in claim 6 wherein said cooling air passages extend in a direction substantially parallel to the exhaust port axis and are circumferentially-spaced around said exhaust port relative to the exhaust port axis.

References Cited by the Examiner
UNITED STATES PATENTS

| | | |
|---|---|---|
| 623,361 | 4/1899 | Frew. |
| 1,457,951 | 6/1923 | Vigilano. |
| 2,808,813 | 10/1957 | Lindhagen et al. |

MARK NEWMAN, *Primary Examiner.*

F. T. SADLER, *Assistant Examiner.*